US008029145B2

(12) United States Patent
Sandberg

(10) Patent No.: US 8,029,145 B2
(45) Date of Patent: Oct. 4, 2011

(54) PERIPHERAL PROJECTION DISPLAY SYSTEM

(75) Inventor: Edmund Sandberg, Los Gatos, CA (US)

(73) Assignee: Rossella Limited, Road Town Tortola (VG)

( * ) Notice: Subject to any disclaimer, the term of this patent is extended or adjusted under 35 U.S.C. 154(b) by 314 days.

(21) Appl. No.: 12/286,022

(22) Filed: Sep. 26, 2008

(65) Prior Publication Data

US 2009/0103058 A1 Apr. 23, 2009

Related U.S. Application Data

(60) Provisional application No. 60/995,802, filed on Sep. 27, 2007.

(51) Int. Cl.
*G03B 21/28* (2006.01)

(52) U.S. Cl. ........................................ 353/78; 353/99

(58) Field of Classification Search .................. 353/74, 353/77, 78, 79, 98, 99
See application file for complete search history.

(56) References Cited

U.S. PATENT DOCUMENTS 6,561,649 B1 * 5/2003 Burstyn .......................... 353/8
6,899,433 B2 * 5/2005 Veligdan ........................ 353/37
7,520,622 B2 * 4/2009 Gohman ........................ 353/72
7,530,694 B2 * 5/2009 Lowe ............................ 353/78
2007/0132964 A1 * 6/2007 Segler et al. .................. 353/78

* cited by examiner

*Primary Examiner* — William C Dowling
(74) *Attorney, Agent, or Firm* — Ladas & Parry, LLP

(57) ABSTRACT

A peripheral projection, display screen system including (a) a display screen having a rear side and a diagonal dimension, (b) an image-projection source coupled to a peripheral of the system and disposed at a defined, image-projection system depth rearwardly of the screen's rear side, (c) an optical path structure operatively interposed and optically coupling the source and the rear side of the screen, coupling the image from the source to the screen's rear side, and within the mentioned, defined image-projection system depth, a displayable image projected by the source, and (d) system geometry structure organizing the screen, the source, and the optical path structure, whereby the depth ratio of the diagonal dimension of the screen to the image-projection depth is equal to or more than 10:1.

19 Claims, 3 Drawing Sheets

10
FRONT SCREEN
13b
16
13c
18a
18b
18c
18d
12
12a
28, 30, 32
20
14
2ND BOUNCE MIRROR FLAT FIRST SURFACE MIRROR
24
OPTICAL ENGINE
13a
13d
18
1ST BOUNCE MIRROR CYLINDRICAL FIRST SURFACE MIRROR 75MM-200MM RADIUS
22
3RD BOUNCE MIRROR CYLINDRICAL FIRST SURFACE MIRROR 3000-5000 MM RADIUS
26

16a
12b
10
26
20
22
18d
12a
12
16
18
18a
18
28, 30, 32
18b
18c
18
14
24
20
W 18d
18
28
$\alpha_1$
28a
$\alpha_2$
28b
28c
28d 18
38
32
40
32a
32b
36
34
$\alpha_3$
32c
32d

PERIPHERAL PROJECTION DISPLAY SYSTEM

CROSS REFERENCE TO RELATED APPLICATION

This application claims filing-date priority to U.S. Provisional Patent Application Ser. No. 60/995,802, filed Sep. 27, 2007, for "Short-Wavelength, Long-Depth-of-Field, Folded-Image Projection". The entire disclosure content of that prior-filed provisional application is hereby incorporated herein by reference.

BACKGROUND AND SUMMARY OF THE INVENTION

This invention relates to a peripheral projection system. More particularly, it relates to a peripheral projection system which is generally upright, and which utilizes a high-resolution laser color projection source. The color projection source may comprise three lasers with appropriate output optics. The peripheral projection system may include the projection source, or alternatively it may be coupled to receive the output of the projection source through the periphery of the peripheral projection system. The output of the color projection source, or "image" is thereafter subjected to a unique optical path structure which vertically folds the image several times within a thin region of space, referred to herein as an image-projection depth region, that lies behind a display screen for displaying the image. The optical path structure includes a "downstream" turning screen which, through an optical diffuser structure, directs the image toward the rear side of the display screen. The nominal plane of the image-projection depth region may substantially parallel that of the display screen.

The invention further comprises what is referred to herein as a system geometry structure—including a periphery including a supporting frame structure—on which components are mounted. The supporting frame structure defines a large ratio of diagonal screen measure to depth (or "depth ratio") of preferably at least 10:1.

The invention thus fits well into that realm of current screen-display system technology which takes aim at providing large-surface-area, but extremely thin, image-display systems of the types typically used, for example, in television and computer-display applications.

The various features and advantages which are offered by the invention, including those just mentioned above, and beyond, will become more fully appreciated as the detailed description of the invention which follows below is read in conjunction with the accompanying drawing figures. With respect to these drawing figures, it should be noted at the outset that the herein-illustrated, cooperative components of the system of the invention, and the organization of those components, are not necessarily drawn to scale.

DETAILED DESCRIPTION OF THE INVENTION

Figure 1:
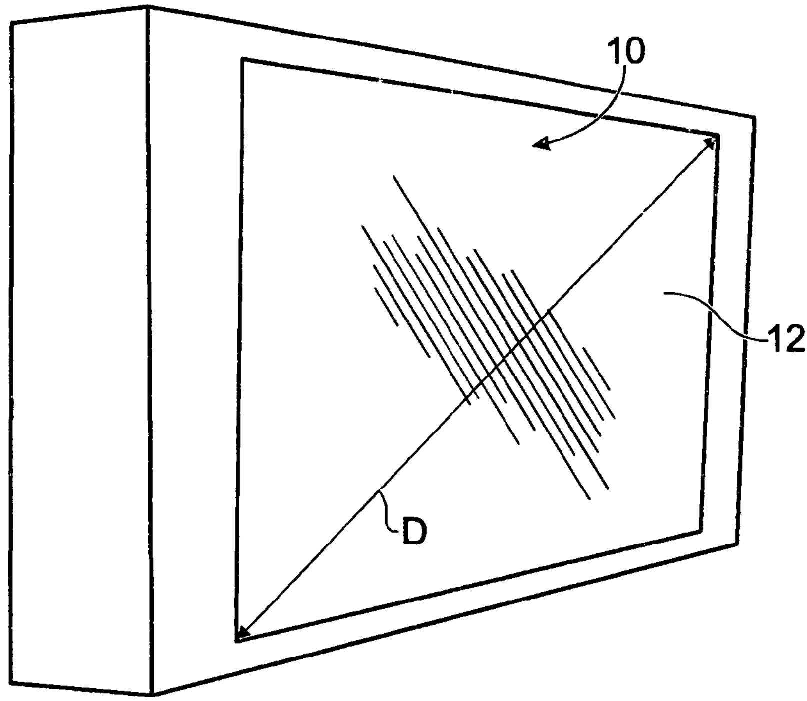
FIG. 1 is a very simplified, isometric view illustrating the front of a peripheral projection system which has been constructed in accordance with a preferred and best-mode embodiment of the present invention.
Figure 2:
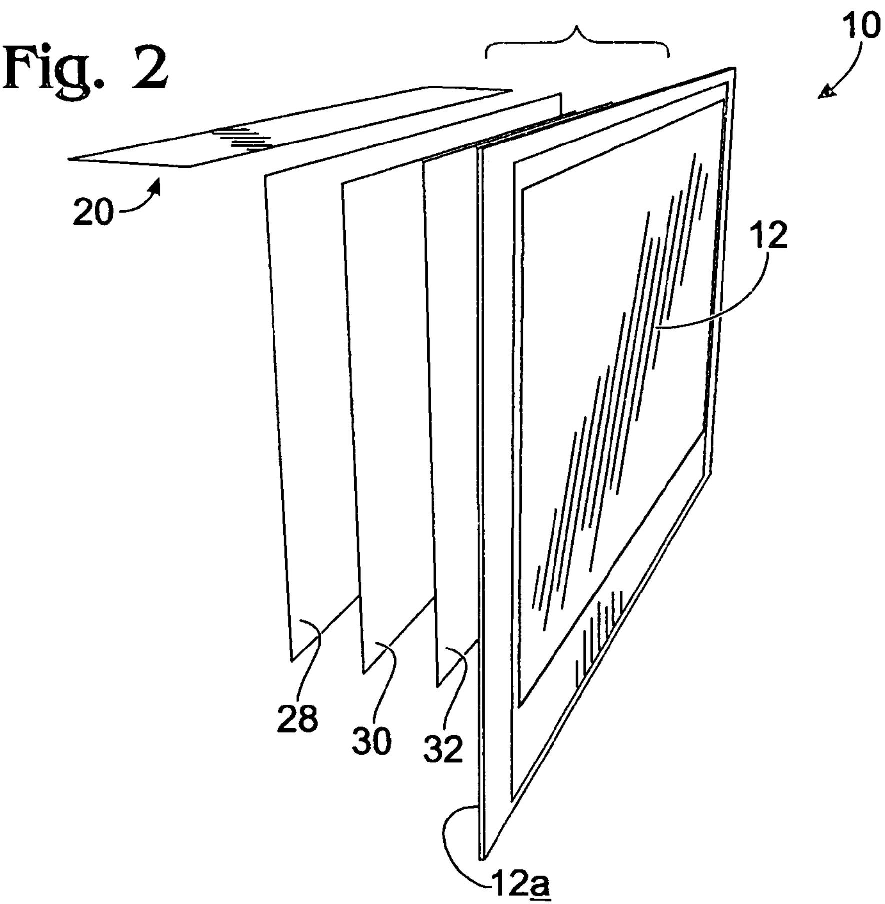
FIG. 2 is a fragmentary, exploded, isometric view, generally taken from the same point of view which is employed in FIG. 1, illustrating just certain ones of the components employed in the display system of FIG. 1.

Referring now to all of the drawing figures, indicated generally at 10 is an upright peripheral projection display system which is constructed in accordance with a preferred and best mode embodiment of the present invention. System 10 includes a generally planar image display screen 12, having a rear side 12*a* and a diagonal measure shown at D in FIG. 1. The nominal plane of the display screen 12 is shown generally at 12*b*. In an embodiment of system 10, the system 10 also includes a projection source 14 mounted to the bottom 13*a* of the system 10. The projection source 14 may alternatively be mounted on any of the bottom 13*a*, top 13*c*, or sides 13*b*, 13*d*, all of which make up the periphery of the system 10. In another embodiment, the projection source 14 may be external to the system 10, and in such embodiment the system 10 includes an interface on the periphery of the system 10 to accept the image which is output from the projection source. The projection source 14 may include a laser-based projection source. The system 10 further includes a generally planar image projection depth region 16 having an image projection depth W (seen especially well in FIG. 4), an optical path structure 18 which is disposed operatively intermediate to source 14 and the rear side of screen 12, and a system geometry structure, including a frame 20, on which the components in the system 10 are suitably mounted. The nominal plane of region 16 is shown generally at 16*a*.

As expressed and illustrated herein, system geometry structure 18 importantly defines, in system 10, a relatively thin optical path structure. The thin optical path structure allows for a depth ratio of diagonal dimension D to image-projection depth W which is at least as large as 10:1. As an example, dimension D herein may be about 52-inches, and dimension W may be about 4-5-inches. As a consequence of depth ratio, system 10 offers a very large image-viewing surface in an otherwise very thin image projection optical structure.

Individually, the several components just mentioned as being included in the system 10 may be (and are herein) entirely conventional in construction, but their cooperative organization, as presented herein in accordance with the present invention, is unique.

In the embodiment of system 10 illustrated in the drawings, wherein the source 14 is coupled to the bottom 13*a* of the system, optical path structure 18 includes (a) an upper first bounce mirror 22, (b) a lower second bounce mirror 24, (c) an upperthird bounce mirror 26, (d) a turning screen 28, (e) a clear glass plate 30, and (f) a planar diffuser structure 32. In one embodiment of the invention, the upper first bounce mirror 22 and upper third bounce mirror 26 are cylindrical, and the lower second bounce mirror 24 is flat. Individually, these components are conventional in construction, and accordingly, only a few, representative details of a few of them are presented herein.

Mirrors 22, 24, 26 may be referred to herein collectively as the cascade substructure or image reflection/expansion structure, or as the upstream portion of optical path structure 18. Turning screen 28 is referred to herein as being the downstream portion of optical path structure 18.

Figure 4:
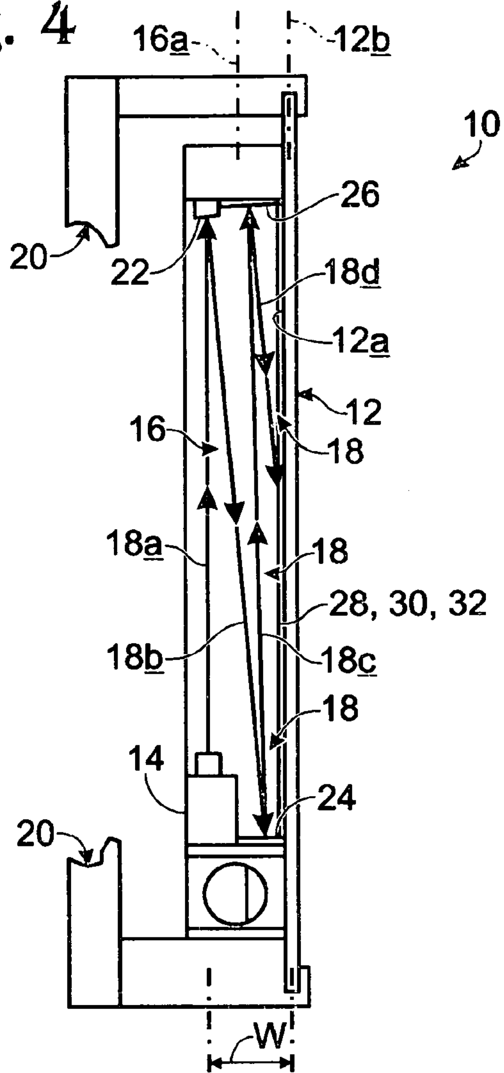
FIG. 4 is a fragmentary side elevation of the system of the invention, illustrating further the optical path structure employed therein, as well as showing schematically several optical paths along which a projected image travels and is folded vertically en route from a projection source to the rear side of the peripheral projection system's display screen.

In FIG. 4 in the drawings, optical path structure 18 defines a vertically folded optical path for the "optical flow" of an image projected from source 14 to the rear side, 12*a*, in display screen 12. This optical path includes, essentially, four portions which are shown in FIG. 4 at 18*a*, 18*b*, 18*c* and 18*d*. Path portion 18*a* lies between source 14 and mirror 22. Path portion 18*b* lies between mirror 22 and mirror 24. Path portion 18*c* lies between mirror 24 and mirror 26. And finally, optical path portion 18*d* lies between mirror 26 and turning screen 28. As such, when an image is input to the optical path structure 18 from the source 14, wherein the image is input on the bottom 13*a* of the system 10, the image is folded a first time by reflection off of mirror 22, a second time by reflection off of mirror 24, and a third time by reflection off of mirror 26. Thus, the optical path 18 of the invention folds the image multiple times within a relatively thin image-projection depth region 16.

Figure 3:
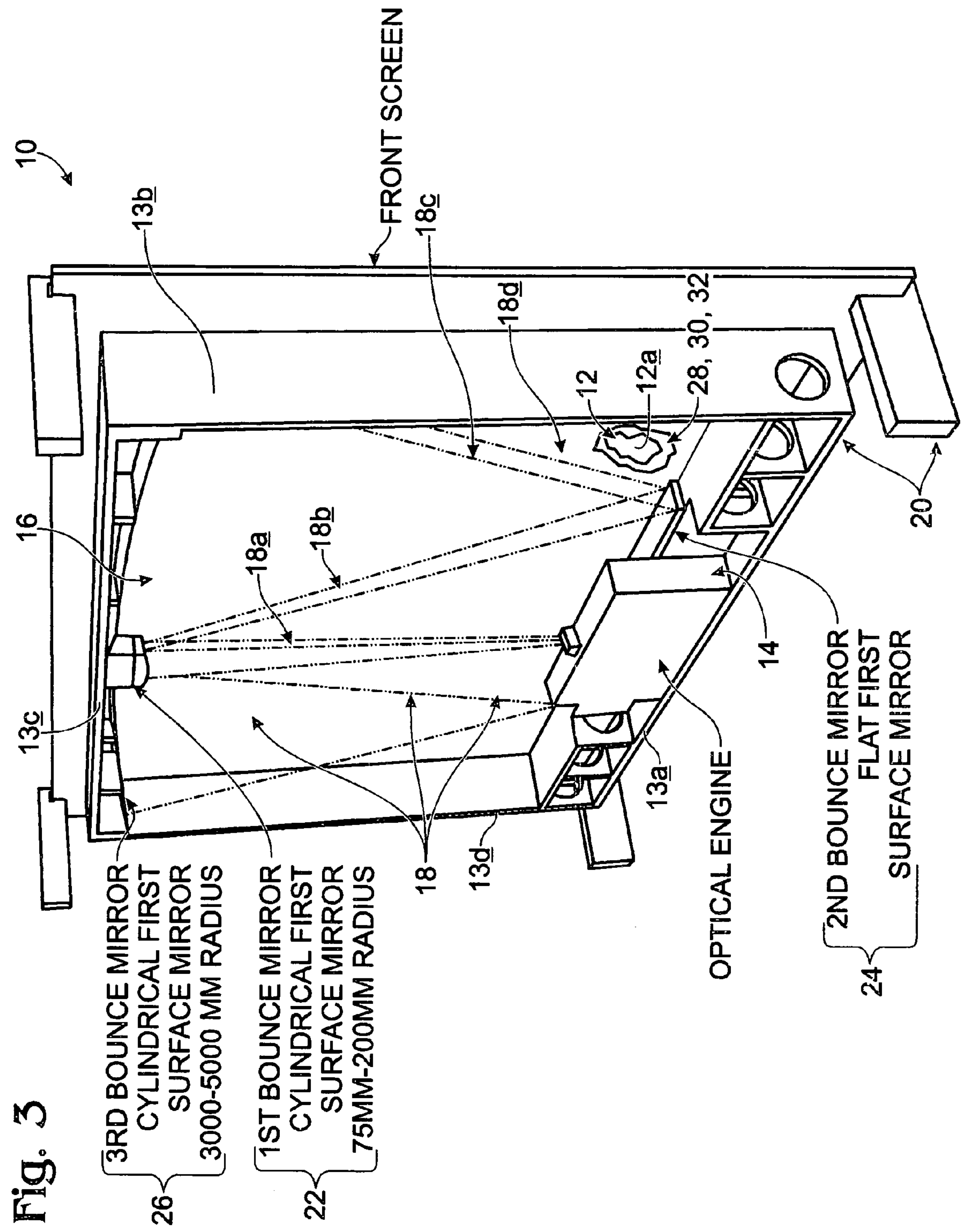
FIG. 3 is a rear isometric view, with covering structure removed, illustrating the rear side of an optical path structure which is employed in the peripheral projection system.

As can be seen in FIG. 4, the just-described optical path portions lie at shallow angles, e.g. angles of about 10-degrees relative to one another. Path portion 18*a*, with system 10 occupying generally an upright, or vertical plane, extends in a vertical plane between source 14 and first-bounce mirror 22, which mirror in one embodiment has a cylindrical, curved-surface radius in the range of about 75-200-millimeters. As can be seen in FIG. 3, path portion 18*a* experiences a slight lateral expansion en route from source 14 to mirror 22.

Path portion 18*b* extends downwardly from mirror 22 to second-bounce mirror 24, expanding laterally along the way generally in a plane which is inclined from the mirror 22 toward rear side 12*a* in screen 12 at a shallow angle, for example, an angle of about 10 degrees.

Optical path portion 18*c* extends upwardly in a generally vertical plane from mirror 24 to third bounce mirror 26 which is located near the top of system 10. The image projection "information" contained in the image within path portion 18*c* continues to expand laterally as it is reflected from mirror 24 to mirror 26. In an embodiment, mirror 26 has a cylindrical, curved-surface radius lying generally within the range of about 3000-5000-millimeters.

Figure 5:
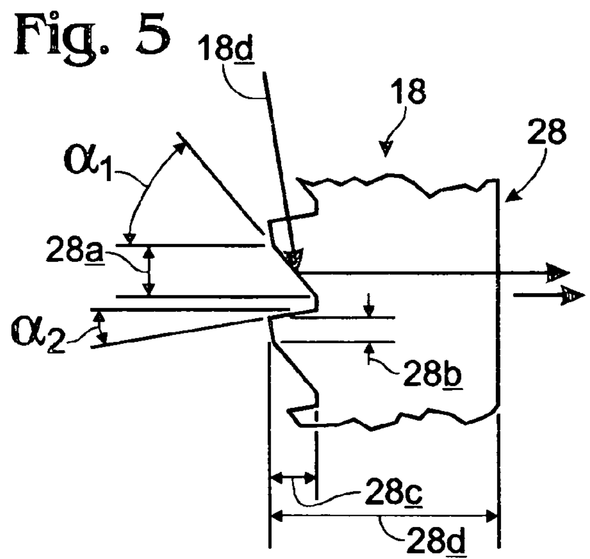
FIG. 5 is a fragmentary cross-section of a portion of a turning screen which is employed in the optical path structure of the invention.

Optical path portion 18*d* extends downwardly, at a downwardly and forwardly glancing shallow angle of, e.g. 10 degrees, from mirror 26 to impinge on what is the rear surface of turning screen 28. FIG. 5, in a much larger scale than that which is employed in FIG. 4, further illustrates impingement of path portion 18*d* onto the mentioned rear surface of turning screen 28.

Turning attention now to FIG. 5 in the drawings, here what is illustrated is a fragmentary, cross-sectional view of a portion of turning screen 28. In the particular preferred embodiment of system in 10 which is illustrated and described herein, turning screen 28 generally has the configuration which is shown in FIG. 5. Those skilled in the art will certainly recognize that different system geometries may dictate a different structure for a turning screen.

Within FIG. 5, two angles and four dimensions are marked. These angles and dimensions are simply illustrative of one "geometry" which may be used in a turning screen. Angle $\alpha_1$ is about 50-degrees, angle $\alpha_2$ is about 10-degrees, dimension 28*a* is about 0.11-millimeters, dimension 28*b* is about 0.05-millimeters, dimension 28*c* is about 0.1-millimeters, and dimension 28*d* lies in the range of about 0.5-1-millimeters. With respect to the particular turning screen 28 which is illustrated herein, dimension 28*d* is about 1-millimeters.

Self-explanatory arrows in FIG. 5 illustrate the relevant optical paths which are associated with screen 28. Optical information emerging from the right side of screen 28 in the FIG. 5 flows through previously mentioned glass plate 30 toward what is the rear side of previously mentioned diffuser structure 32.

Figure 6:
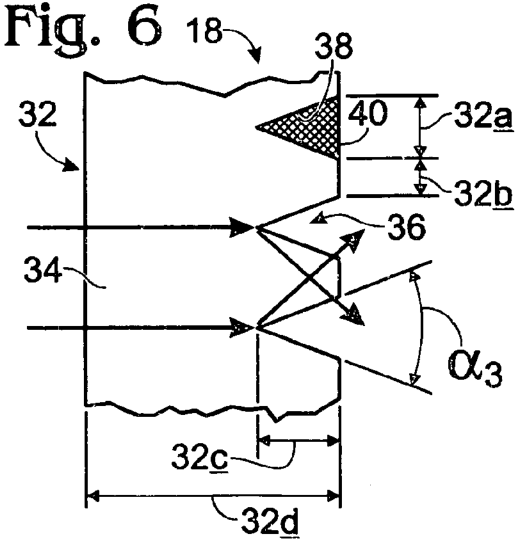
FIG. 6 is a fragmentary cross-section of a portion of a diffuser structure which is employed in the peripheral projection system intermediate the turning screen of FIG. 5, and the rear side of the display screen.

FIG. 6 in the drawings furnishes an enlarged, fragmentary, cross-sectional view of a portion of diffuser structure 32. Diffuser structure 32 includes a clear substrate 34 possessing a plurality of isosceles triangular horizontally extending front surface grooves 36 which are outwardly surface-coated with aluminum particulate material 38. Each of these grooves is appropriately filled with a darkened, black filler material which is shown generally at one location only in FIG. 6 at 40.

In FIG. 6, angle $\alpha_3$ is about 40-degrees, dimension 32*a* is about 0.12-millimeters, dimension 32*b* is about 0.08-millimeters, dimension 32*c* is about 0.16-millimeters, and dimension 32*d* is a dimension which lies generally within the range of about 0.5-1-millimeters. With respect to the particular diffuser structure 32 which is illustrated herein, dimension 32*d* is about 1-millimeters.

Those having skill in the art will appreciate that there are various vehicles by which the system described herein can be effected, and that the preferred vehicle will vary with the context in which the processes are deployed.

For example, while the embodiment of the invention herein describes a three-mirror structure of optical path 18, one can appreciate that one may employ more mirrors in implementing the structure of the invention. Furthermore, while the peripheral projection system described herein illustrates the source being coupled to the bottom of the system and the first bounce mirror being coupled to the top of the system, this configuration could be rotated in an implementation of the invention.

The foregoing described aspects depict different components contained within, or connected with, different other components. It is to be understood that such depicted system architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

I claim:

1. A peripheral projection system comprising:

a display screen having a rear side, a periphery comprising a first side located at an angle to the display screen and a second side opposing the first side;

an interface located on said first side of the periphery that receives an image from an image projection source, an optical path structure optically coupling said image to the rear side of said display screen, wherein said image is vertically folded by at least a first bounce mirror located on and parallel to the first side and a second bounce mirror located on and parallel to the second side of the periphery.

2. The system of claim 1 wherein said source is laser-based.

3. The system of claim 2, wherein said optical path structure includes an upstream portion characterized, at least in part, by image reflection/expansion structure, and a downstream portion characterized at least in part, by a turning screen which is disposed rearwardly adjacent to said rear side of said display screen.

4. The system of claim 1, wherein said display screen is generally planar, and said optical path structure includes an image reflection/expansion structure which performs at least a portion of the vertical folding, and does so within a generally planar region which (a) occupies the system's defined, image-projection depth, and (b) substantially parallels the plane of said screen.

5. The system of claim 4, wherein said reflection/expansion structure includes cooperatively interactive, cascade substructure in the forms of (a) said first bounce mirror located optically downstream from said source, (b) said second-bounce mirror located optically downstream from said first bounce mirror, and (c) a third-bounce mirror located optically downstream from said second bounce mirror.

6. The system of claim 5, wherein said first bounce mirror is cylindrical, said second bounce mirror is flat, and said third bounce mirror is cylindrical.

7. The system of claim 4, wherein said source is laser-based.

8. The system of claim 1, wherein said optical path structure includes an upstream portion characterized, at least in part, by image reflection/expansion structure, and a downstream portion characterized, at least in part, by a turning screen which is disposed rearwardly adjacent said screen's said rear side.

9. The system of claim 8, wherein said source is laser-based.

10. The system of claim 1, wherein the depth of the peripheral projection system is equal to or less than one-tenth the diagonal dimension of said display screen.

11. A peripheral projection system comprising:

a display screen having a rear side, a periphery comprising a first side located at an angle to the display screen and a second side opposing the first side;

an image projection source which outputs an image and which is coupled to said first side of the periphery, an optical path structure optically coupling said image to the rear side of said display screen, wherein said image is vertically folded by at least a first bounce mirror located on and parallel to the first side and a second bounce mirror located on and parallel to the second side of the periphery.

12. The system of claim 11, wherein said source is laser-based.

13. The system of claim 12, wherein said optical path structure includes an upstream portion characterized, at least in part, by image reflection/expansion structure, and a downstream portion characterized at least in part, by a turning screen which is disposed rearwardly adjacent to said rear side of said display screen.

14. The system of claim 11, wherein said display screen is generally planar, and said optical path structure includes an image reflection/expansion structure which performs at least a portion of the vertical folding, and does so within a generally planar region which (a) occupies the system's defined, image-projection depth, and (b) substantially parallels the plane of said screen.

15. The system of claim 14, wherein said reflection/expansion structure includes cooperatively interactive, cascade substructure in the forms of (a) said first bounce mirror located optically downstream from said source, (b) said second-bounce mirror located optically downstream from said first bounce mirror, and (c) a third-bounce mirror located optically downstream from said second bounce mirror.

16. The system of claim 15, wherein said first bounce mirror is cylindrical, said second bounce mirror is flat, and said third bounce mirror is cylindrical.

17. The system of claim in 11, wherein said optical path structure includes an upstream portion characterized, at least in part, by image reflection/expansion structure, and a downstream portion characterized, at least in part, by a turning screen which is disposed rearwardly adjacent said screen's said rear side.

18. The system of claim 11, wherein the depth of the peripheral projection system is equal to or less than one-tenth of diagonal dimension of said display screen.

19. A peripheral projection system comprising:

a display screen;

an image from a laser projection source, wherein the image is received on a first side of a periphery of the projection system;

an optical path structure that vertically folds said image using a plurality of mirrors, wherein at least one such mirror is located on and parallel to said first side, and at least one such mirror is located on and parallel to a second side of a periphery of the projection system, wherein the second side is opposing the first side; and a depth of the peripheral projection system which is equal to or less than one-tenth the diagonal dimension of said display screen.

* * * * *